United States Patent
Endo et al.

(10) Patent No.: US 9,718,458 B2
(45) Date of Patent: Aug. 1, 2017

(54) VEHICLE

(71) Applicant: TOYOTA JIDOSHA KABUSHIKI KAISHA, Toyota-shi, Aichi-ken (JP)

(72) Inventors: Hiroki Endo, Nissin (JP); Koji Hokoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/302,324

(22) PCT Filed: Mar. 12, 2015

(86) PCT No.: PCT/IB2015/000317
§ 371 (c)(1),
(2) Date: Oct. 6, 2016

(87) PCT Pub. No.: WO2015/155583
PCT Pub. Date: Oct. 15, 2015

(65) Prior Publication Data
US 2017/0021822 A1    Jan. 26, 2017

(30) Foreign Application Priority Data

Apr. 11, 2014  (JP) ................. 2014-081919

(51) Int. Cl.
*B60W 20/00*  (2016.01)
*B60W 10/06*  (2006.01)
(Continued)

(52) U.S. Cl.
CPC ............... *B60W 20/13* (2016.01); *B60K 6/26* (2013.01); *B60K 6/365* (2013.01); *B60K 6/445* (2013.01);
(Continued)

(58) Field of Classification Search
CPC .............. B60W 20/13; B60W 20/00; B60W 2510/242; B60W 2510/244;
(Continued)

(56) References Cited

U.S. PATENT DOCUMENTS 8,892,286 B2 * 11/2014 Morita ................ B60K 6/445
180/65.25
9,515,583 B2 * 12/2016 Suhama .............. H02P 21/0021

FOREIGN PATENT DOCUMENTS

JP    2007-131103    5/2007
JP    2010-269626 A  2/2010

* cited by examiner

*Primary Examiner* — John Walters
(74) *Attorney, Agent, or Firm* — Finnegan, Henderson, Farabow, Garrett & Dunner, LLP

(57) ABSTRACT

A vehicle includes an engine, a motor, a rotary electric machine, a battery, and an ECU. The ECU is configured to control the rotary electric machine to generate electric power when the engine is started during the motor traveling mode and provide a cranking torque to the engine, the electric power generated by the rotary electric machine increasing as a vehicle speed increases, and determine whether or not to start the engine based on a comparison between a sum of electric power and a value corresponding to electric power acceptable by the battery. The sum of electric power is a sum of first electric power actually input into and output from the battery during the motor traveling mode and second electric power predicted to be generated by the rotary electric machine while the cranking torque is provided to the engine.

4 Claims, 5 Drawing Sheets

(51) Int. Cl.
*B60W 10/08* (2006.01)
*B60W 10/26* (2006.01)
*B60W 20/13* (2016.01)
*B60K 6/365* (2007.10)
*B60K 6/445* (2007.10)
*B60K 6/48* (2007.10)
*B60K 6/26* (2007.10)

(52) U.S. Cl.
CPC ............. *B60K 6/48* (2013.01); *B60W 10/06* (2013.01); *B60W 10/08* (2013.01); *B60W 10/26* (2013.01); *B60W 20/00* (2013.01); B60K 2006/268 (2013.01); B60W 2510/242 (2013.01); B60W 2510/244 (2013.01); B60W 2520/10 (2013.01); *Y02T 10/48* (2013.01); *Y02T 10/6221* (2013.01); *Y02T 10/6239* (2013.01); *Y02T 10/6286* (2013.01); *Y02T 10/84* (2013.01)

(58) Field of Classification Search
CPC .. B60W 2510/10; B60W 10/06; B60W 10/08; B60W 10/26; B60K 6/26; B60K 6/365; B60K 6/445; B60K 6/48; B60K 2006/268; Y02T 10/48; Y02T 10/6221; Y02T 10/6239; Y02T 10/6286; Y02T 10/84
USPC ................. 180/65.265, 65.28, 65.285, 65.29
See application file for complete search history.

VEHICLE

CROSS-REFERENCE TO RELATED APPLICATIONS

This application is a national phase application of International Application No. PCT/IB2015/000317, filed Mar. 12, 2015, and claims the priority of Japanese Application No. 2014-081919, filed Apr. 11, 2014, the content of both of which is incorporated herein by reference.

BACKGROUND OF THE INVENTION

1. Field of the Invention

The invention relates to a vehicle capable of traveling by using power of at least one of an engine and a motor and, more particularly, to a vehicle provided with a rotary electric machine providing a cranking torque to act on an engine by generating electric power.

2. Description of Related Art

Japanese Patent Application Publication No. 2007-131103 (JP 2007-131103 A) discloses a hybrid vehicle provided with an engine, a motor that is connected to a drive wheel, and a generator that is connected to the engine and the motor via a planetary gear device. The hybrid vehicle is capable of motor traveling in which the hybrid vehicle travels by using power of the motor in a state where the engine is stopped. During the motor traveling, the generator is rotated in the direction opposite to a rotation direction of the motor as the motor rotates. When the engine is started during the motor traveling, the generator generates electric power so that a cranking torque acts on the engine.

The electric power that is generated by the generator during cranking is accepted by a vehicle battery. The absolute value of a rotation speed of the generator during the motor traveling increases as a rotation speed of the motor (that is, a vehicle speed) increases. Accordingly, the electric power that is generated by the generator during the cranking increases as the vehicle speed increases and is highly likely to exceed electric power that can be accepted by the battery. In view of this, an upper limit vehicle speed for the motor traveling is set according to the electric power that can be accepted by the battery in the hybrid vehicle and the engine is promptly started (cranked) in a case where the vehicle speed exceeds the upper limit vehicle speed during the motor traveling. In this manner, the electric power that is input into the battery during the cranking exceeding the electric power that can be accepted by the battery can be suppressed.

SUMMARY OF THE INVENTION

However, if the engine is started every time the condition of the vehicle speed exceeding the upper limit vehicle speed during the motor traveling is satisfied as in the vehicle disclosed in JP 2007-131103 A, the engine may be started even when unnecessary. In other words, at least a part of the electric power that is generated by the rotary electric machine during the cranking is not input into the battery and is consumed by electric equipment on a discharge destination, even if the cranking is performed in a state where the vehicle speed exceeds the upper limit vehicle speed, in a case where the battery is in discharging. Accordingly, the electric power that is input into the battery may not exceed the electric power acceptable by the battery. However, the vehicle disclosed in JP 2007-131103 A unnecessarily starts the engine even in this case.

The invention provides a vehicle capable of suppressing unnecessary engine start during motor traveling.

A vehicle according to an aspect of the invention includes an engine, a motor, a rotary electric machine, a battery, and an ECU. The motor is connected to a drive wheel. The vehicle is to travel by using power of at least one of the motor and the engine. The rotary electric machine is connected to the engine and the motor via a planetary gear device. The rotary electric machine is configured to rotate in a direction opposite to a rotation direction of the motor during a motor traveling mode of operation, the motor traveling mode being one in which the vehicle is allowed to travel on the power of the motor while the engine is stopped. The battery is configured to exchange electric power with a plurality of electric equipment including the motor and the rotary electric machine. The ECU is configured to (a) control the rotary electric machine to generate electric power when the engine is started during the motor traveling mode and provide a cranking torque to the engine, the electric power generated by the rotary electric machine increasing as a vehicle speed increases, and (b) determine whether or not to start the engine based on a comparison between a sum of electric power and a value corresponding to electric power acceptable by the battery, wherein the sum of electric power is a sum of first electric power actually input into and output from the battery during the motor traveling mode and second electric power predicted to be generated by the rotary electric machine while the cranking torque is provided to the engine.

According to the above-described aspect, it is determined whether or not to start the engine during the motor traveling based on not only the second electric power predicted to be generated by the rotary electric machine during the cranking and the acceptable electric power by the battery but also the first electric power actually input into and output from the battery. Accordingly, unnecessary engine start during the motor traveling can be suppressed.

In the above-described aspect, the ECU may be configured to provide the cranking torque and start the engine when the sum of the electric power exceeds the value corresponding to the electric power acceptable by the battery.

According to the above-described aspect, the cranking can be promptly performed so that the engine can be started when the sum of the electric power exceed the electric power acceptable by the battery based on the first electric power actually input into and output from the battery during the motor traveling. Accordingly, the electric power that is input into the battery during the cranking exceeding the electric power that can be accepted by the battery can be suppressed.

In the above-described aspect, the ECU may be configured to maintain a state which the engine is stopped, when the vehicle speed exceeds an upper limit vehicle speed for the motor traveling mode, the upper limit vehicle speed set according to the electric power acceptable by the battery and the sum of the electric power does not exceed the value corresponding to the electric power acceptable by the battery.

According to the above-described aspect, the state which the engine is stopped can be maintained, even if the vehicle speed exceeds the upper limit vehicle speed for the motor traveling that is set according to the electric power acceptable by the battery during the motor traveling, in a case where the sum of the electric power not to exceed the electric power that can be accepted by the battery based on the first electric power actually input into and output from the battery. Accordingly, unnecessary engine start during the motor traveling can be suppressed.

In the above-described aspect, the planetary gear device may include a sun gear connected to the rotary electric machine, a ring gear connected to the motor, a pinion gear engaged with the sun gear and the ring gear, and a carrier supporting the pinion gear to be rotatable and connected to the engine. The ECU may be configured to set the electric power predicted to be generated by the rotary electric machine while the cranking torque is provided to the engine to a larger value as the vehicle speed increases.

According to the above-described aspect, the electric power predicted to be generated by the rotary electric machine during the cranking can be appropriately set according to the vehicle speed. Accordingly, it can be appropriately determined whether or not to continue the state where the engine is stopped during the motor traveling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
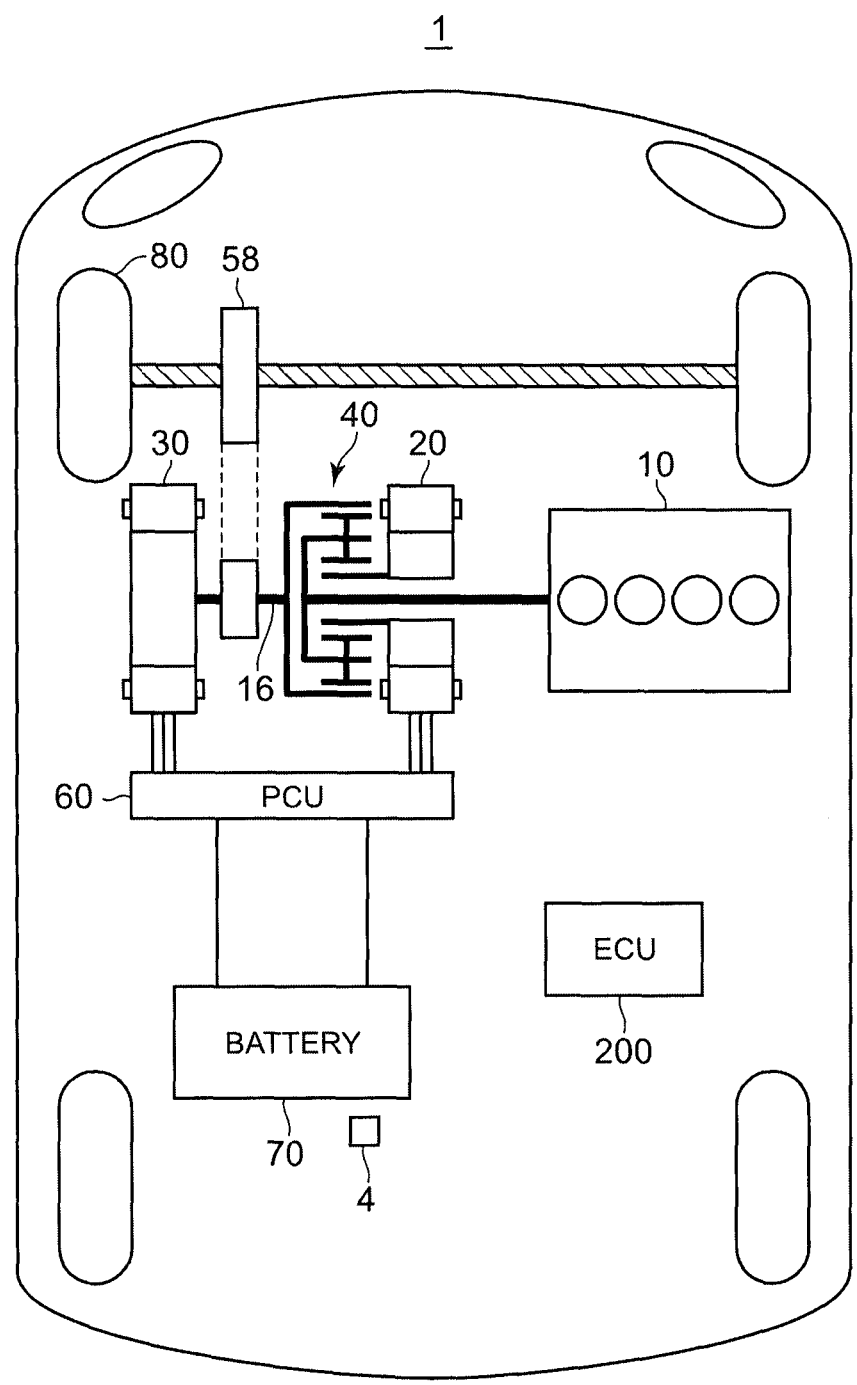
FIG. 1 is an overall block diagram of a vehicle.

Hereinafter, embodiments of the invention will be described with reference to accompanying drawings. In the following description, the same reference numerals will be attached to the same components as with designations and functions thereof. Detailed description thereof will not be repeated.

FIG. 1 is an overall block diagram of a vehicle 1 according to this embodiment. The vehicle 1 includes an engine 10, a drive shaft 16, a first motor generator (hereinafter, referred to as a "first MG" in some cases) 20, a second motor generator (hereinafter, referred to as a "second MG" in some cases) 30, a power split device 40, a decelerator 58, a power control unit (PCU) 60, a battery 70, drive wheels 80, and an electronic control unit (ECU) 200.

The vehicle 1 is a hybrid vehicle that travels on power of at least one of the engine 10 and the second MG 30. This means that the hybrid vehicle travels on power of the engine 10 only, the second MG 30 only, or both.

The power that is generated by the engine 10 is split to two paths by the power split device 40. One of the two paths is a path for transmission to the drive wheels 80 via the decelerator 58. The other path is a path for transmission to the first MG 20.

The first MG 20 and the second MG 30 are, for example, three-phase AC rotary electric machines. The first MG 20 and the second MG 30 are driven by the PCU 60.

The first MG 20 is connected to the engine 10 and the second MG 30 via the power split device 40. The first MG 20 has a function as a generator that generates electric power by using the power of the engine 10 which is split by the power split device 40. As described later, the first MG 20 provides a cranking torque to act on the engine 10 by generating the electric power when the engine 10 is started during motor traveling using the power of the second MG 30 in a state where the engine 10 is stopped.

The second MG 30 is connected to the drive wheels 80 via the decelerator 58. The second MG 30 has a function as a driving motor that gives a driving force to the drive wheels 80 by using at least any one of electric power which is stored in the battery 70 and the electric power which is generated by the first MG 20. The second MG 30 also has a function as a generator that generates electric power by using electric power which is generated by regenerative braking.

The power split device 40 is a planetary gear mechanism that includes a sun gear, a pinion gear, a carrier, and a ring gear. The pinion gear is engaged with each of the sun gear and the ring gear. The carrier supports the pinion gear to be rotatable and is connected to a crankshaft of the engine 10. The sun gear is connected to a rotating shaft of the first MG 20. The ring gear is connected to a rotating shaft of the second MG 30 and the decelerator 58 with the drive shaft 16 interposed.

Figure 2:
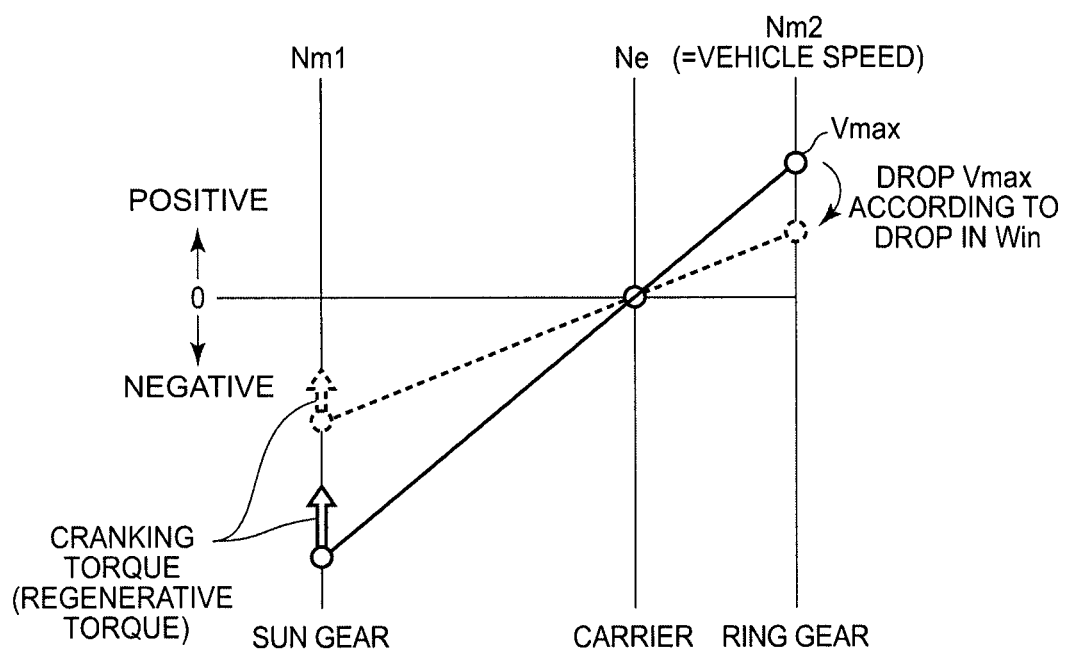
FIG. 2 is a nomogram illustrating a power split device.

The engine 10, the first MG 20, and the second MG 30 are connected via the power split device 40, and thus a rotation speed of the engine 10 (hereinafter, referred to as an "engine rotation speed Ne"), a rotation speed of the first MG 20 (hereinafter, referred to as a "first MG rotation speed Nm1"), and a rotation speed of the second MG 30 (hereinafter, referred to as a "second MG rotation speed Nm2") have a linearly connected relationship (any one of the three being determined when the other two of the three are determined) in a nomogram of the power split device 40 as illustrated in FIG. 2 (described later).

The PCU 60 converts the DC electric power that is stored in the battery 70 to AC electric power by which the first MG 20 and/or the second MG 30 can be driven. In addition, the PCU 60 converts the AC electric power that is generated by the first MG 20 and/or the second MG 30 to DC electric power with which the battery 70 can be charged.

The battery 70 is connected to the first MG 20, the second MG 30, and a plurality of electric equipment including auxiliary machinery such as an air-conditioning device (heat pump, not illustrated) and a DC/DC converter (not illustrated). The electric power is exchanged between the battery 70 and the electric equipment.

In addition, a monitoring sensor 4 is disposed in the vehicle 1. The monitoring sensor 4 detects states (current, voltage, temperature, and the like) of the battery 70 and transmits detection results to the ECU 200.

In addition, a plurality of sensors (not illustrated) are disposed in the vehicle 1 so as to detect various physical quantities, such as an accelerator opening (amount of an accelerator pedal operation by a user), the engine rotation speed Ne, the first MG rotation speed Nm1, the second MG rotation speed Nm2, and a vehicle speed, which are required for controlling the vehicle 1. These sensors transmit detection results to the ECU 200.

The ECU 200 is an electronic control unit into which a central processing unit (CPU, not illustrated) and a memory (not illustrated) are built. The ECU 200 executes predetermined computation processing based on information from each of the sensors and information stored in the memory and controls each of the equipment of the vehicle 1 based on calculation results.

The ECU 200 allows the vehicle 1 to travel in the motor traveling or hybrid traveling. During the motor traveling, the vehicle 1 travels by using the power of the second MG 30 in a state where the engine 10 is stopped. During the hybrid traveling, the vehicle 1 travels by using the power of both the engine 10 and the second MG 30 with the engine 10 in operation.

The ECU 200 calculates an electric power storage state (hereinafter, referred to as an "SOC") of the battery 70 based on the detection result of the monitoring sensor 4. The SOC is a ratio (unit:%) of an actual electric power storage amount of the battery 70 to a full-charge capacity of the battery 70. Various known methods can be used in calculating the SOC, examples of which include a calculation method using a relationship between the voltage of the battery 70 and the SOC and a calculation method using a current integrated value of the battery 70.

The ECU 200 sets electric power that can be accepted by the battery 70 (hereinafter, referred to as "battery-acceptable electric power Win") according to the temperature and the SOC of the battery 70 and controls each of the equipment so that electric power that is actually input into and output from the battery 70 (hereinafter, referred to as "battery electric power Pb") does not exceed the battery-acceptable electric power Win. In this manner, degradation of the battery 70 is suppressed. Units of both the battery-acceptable electric power Win and the battery electric power Pb are watts.

In the following description, a case where the battery electric power Pb is positive (+) is considered to mean a case where the battery 70 outputs the electric power (discharge) and a case where the battery electric power Pb is negative (−) is considered to mean a case where the electric power is input into the battery 70 (charge) for convenience of description. Accordingly, the electric power that is output by the battery 70 is considered to increase as the battery electric power Pb increases (absolute value increases) in a case where the battery electric power Pb is positive (+).

The electric power that is input into the battery 70 is considered to increase as the battery electric power Pb decreases (absolute value increases) in a case where the battery electric power Pb is negative (−). Likewise, the battery-acceptable electric power Win is a negative (−) value and the electric power that can be accepted by the battery 70 is considered to increase as the battery-acceptable electric power Win decreases (absolute value increases).

FIG. 2 illustrates the nomogram of the power split device 40 in the motor traveling. As illustrated in FIG. 2, the engine rotation speed Ne, the first MG rotation speed Nm1, and the second MG rotation speed Nm2 have the linearly connected relationship (any one of the three being determined when the other two of the three are determined) in the nomogram. Since the second MG 30 is connected to the drive wheels 80 via the decelerator 58, the second MG rotation speed Nm2 corresponds to the vehicle speed.

During the motor traveling, the engine 10 is stopped and the engine rotation speed Ne is maintained at zero. In this case, the first MG 20 is rotated in the direction opposite to a rotation of the second MG 30 as the second MG 30 rotates. As illustrated in FIG. 2, the first MG 20 rotates in a negative direction (Nm1<0) in a case where the second MG 30 rotates in a positive direction (Nm2>0). The absolute value of the first MG rotation speed Nm1 increases as the second MG rotation speed Nm2 (that is, the vehicle speed) increases.

In a case where the engine 10 is started during the motor traveling, the ECU 200 allows the first MG 20 to generate the electric power and allows a regenerative torque for cranking the engine 10 to be generated from the first MG 20. After the engine rotation speed Ne rises on the regenerative torque (hereinafter, referred to as a "cranking torque" in some cases) of the first MG 20 and reaches a predetermined speed, the ECU 200 initiates ignition control on the engine 10. Starting of the engine 10 is completed through combustion (so-called initial explosion) by the ignition control.

The AC electric power that is generated by the first MG 20 during the cranking of the engine 10 (hereinafter, referred to as "cranking power generation electric power") is converted to DC electric power by the PCU 60 and is supplied to the battery 70. The absolute value of the first MG rotation speed Nm1 during the motor traveling increases as the vehicle speed increases, and thus the cranking power generation electric power increases as the vehicle speed increases and is highly likely to exceed the battery-acceptable electric power Win.

The ECU 200 sets an upper limit vehicle speed Vmax for the motor traveling according to the battery-acceptable electric power Win and sets the condition of the "vehicle speed during the motor traveling exceeding the upper limit vehicle speed Vmax" as a first condition for starting the engine 10 during the motor traveling (that is, transition from the motor traveling to the hybrid traveling). The upper limit vehicle speed Vmax is set to a value that is lower by a predetermined speed than the vehicle speed at which the cranking power generation electric power reaches the battery-acceptable electric power Win. Accordingly, the cranking power generation electric power is below the battery-acceptable electric power Win even if the cranking is performed at a point of time when the vehicle speed exceeds the upper limit vehicle speed Vmax.

In a case where the battery-acceptable electric power Win drops, the ECU 200 drops the upper limit vehicle speed Vmax in response to the drop in the battery-acceptable electric power Win. In this manner, the first condition described above can be satisfied (the engine 10 can be started with ease) in a state where the vehicle speed is lower (state where the cranking power generation electric power is lower).

In addition, the ECU 200 calculates the battery electric power Pb and a predicted value α of the cranking power generation electric power during the motor traveling and sets the condition of the "sum of the battery electric power Pb and the predicted value α of the cranking power generation electric power exceeding a threshold Pwin that corresponds to the battery-acceptable electric power Win" as a second condition for starting the engine 10 during the motor traveling.

Herein, the "battery electric power Pb" is the electric power that is actually input into and output from the battery 70 as described above and is calculated to be positive (+) during the discharge of the battery 70 and be negative (−) during the charge of the battery 70. The ECU 200 calculates the battery electric power Pb based on the detection result of the monitoring sensor 4.

The "predicted value α of the cranking power generation electric power" is the electric power that is predicted to be generated by the first MG 20 when the engine 10 is cranked during the motor traveling. The cranking power generation electric power acts on a side where the battery 70 is charged, and thus the predicted value α is a negative (−) value. A correspondence relationship between the vehicle speed and the cranking power generation electric power that is obtained in an experiment or the like is stored in advance in the ECU 200, and the predicted value α of the cranking power generation electric power that corresponds to the actual vehicle speed is calculated by using the correspondence relationship. Accordingly, the predicted value α of the cranking power generation electric power is a variable value corresponding to the vehicle speed and is calculated to be a value that increases as the vehicle speed increases.

The "threshold Pwin" is a negative (−) value and is set to a value that is higher by a predetermined value than the battery-acceptable electric power Win (value whose absolute value is lower by the predetermined value). Accordingly, the electric power that is input into the battery 70 is below the battery-acceptable electric power Win even if the cranking is performed at a point of time when the sum of the battery electric power Pb and the predicted value α exceeds the threshold Pwin. In this embodiment, the "sum of the battery electric power Pb and the predicted value α exceeding the threshold Pwin" means Pb+α<Pwin (that is, |Pb+α|>|Pwin|).

The ECU 200 starts (cranks) the engine 10 in a case where both the first condition and the second condition described above are satisfied during the motor traveling and maintains a state where the engine 10 is stopped in a case where at least one of the first condition and the second condition described above is not satisfied.

In other words, the ECU 200 does not start the engine 10 and maintains a state where the engine 10 is stopped in a case where the sum of the battery electric power Pb and the predicted value α of the cranking power generation electric power does not exceed the threshold Pwin corresponding to the battery-acceptable electric power Win (in a case where the second condition is not satisfied) even if the vehicle speed exceeds the upper limit vehicle speed Vmax set according to the battery-acceptable electric power Win during the motor traveling (even if the first condition is satisfied).

Figure 3:
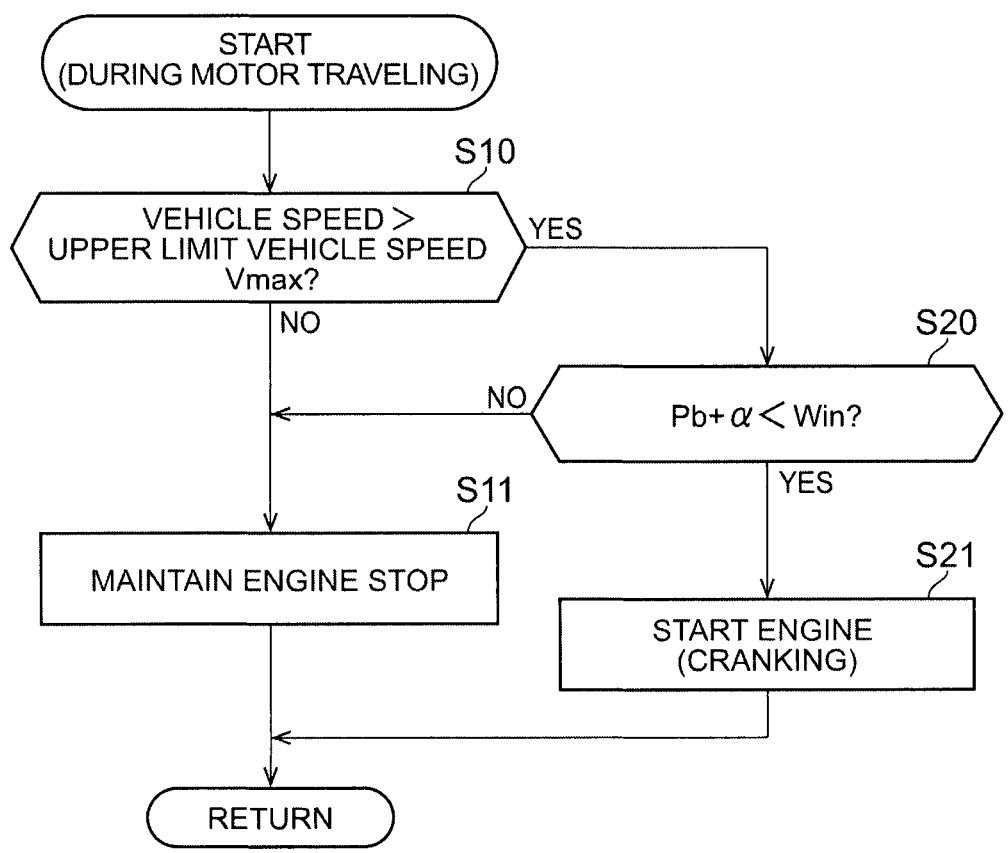
FIG. 3 is a flowchart illustrating a procedure of processing that is performed by an ECU.

FIG. 3 is a flowchart illustrating a procedure of processing that is performed by the ECU 200 during the motor traveling. This flowchart is executed and repeated at a predetermined cycle, during the motor traveling.

In Step (hereinafter, Step will be simplified into "S") 10, the ECU 200 determines whether or not the first condition described above is satisfied, that is, whether or not the vehicle speed exceeds the upper limit vehicle speed Vmax that is set according to the battery-acceptable electric power Win.

In a case where the vehicle speed does not exceed the upper limit vehicle speed Vmax (NO in S10), the ECU 200 maintains a state where the engine 10 is stopped in S11.

In a case where the vehicle speed exceeds the upper limit vehicle speed Vmax (YES in S10), the ECU 200 determines whether or not the second condition described above is satisfied, that is, whether or not the sum of the current battery electric power Pb and the predicted value α of the cranking power generation electric power exceeds the threshold Pwin corresponding to the battery-acceptable electric power Win (whether or not Pb+α<Pwin) in S20.

In a case where the sum of the battery electric power Pb and the predicted value α exceeds the threshold Pwin (YES in S20), that is, in a case where Pb+α<Pwin (|Pb+α|>|Pwin|), the ECU 200 starts and cranks the engine 10 in S21.

In a case where the sum of the battery electric power Pb and the predicted value α does not exceed the threshold Pwin (NO in S20), that is, in a case where Pb+α>Pwin (|Pb+α|<|Pwin|), the ECU 200 allows the processing to proceed to S11 and maintains a state where the engine 10 is stopped.

Figure 4:
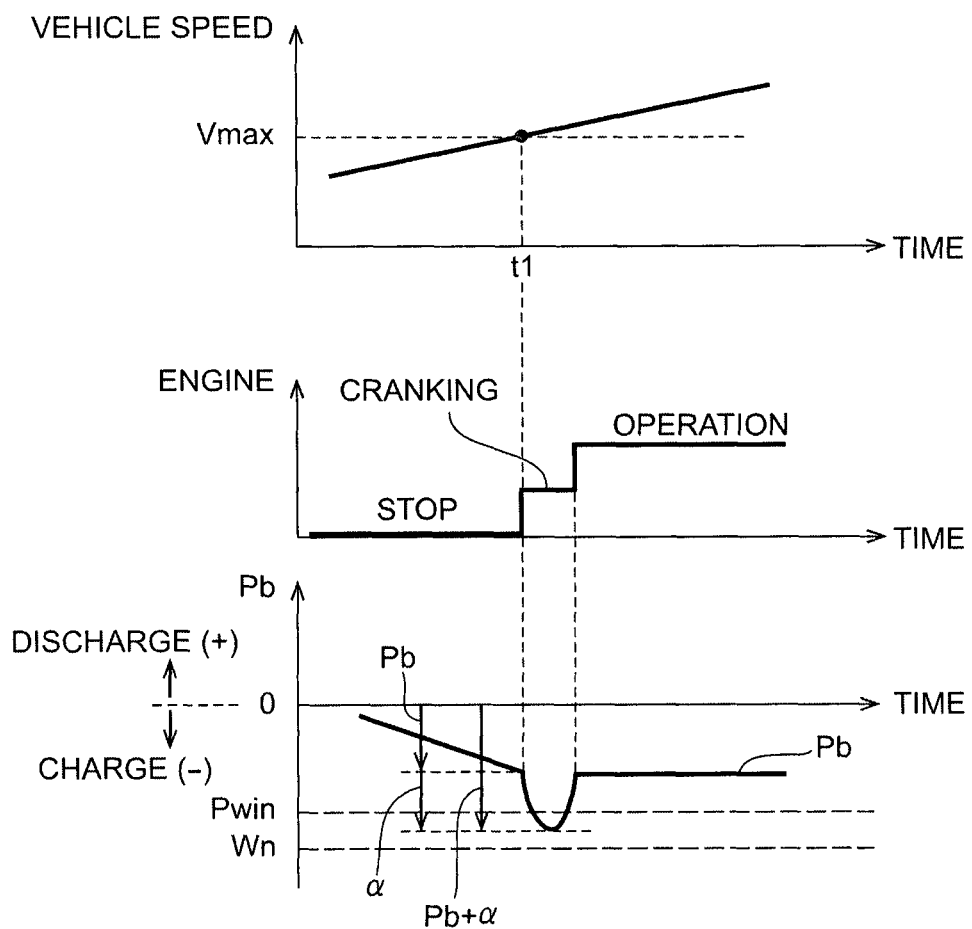
FIG. 4 is a diagram illustrating state changes of an engine and battery electric power (first embodiment)

FIG. 4 is a diagram illustrating state changes of the engine 10 and the battery electric power Pb in a case where the vehicle speed increases in an accelerator OFF (accelerator opening=0) state during the motor traveling. A case where acceleration occurs due to the weight (gravitational acceleration) of the vehicle traveling downhill is assumed as an example of the case where the vehicle speed increases in the accelerator OFF state.

In this case, the accelerator is OFF and thus the regenerative braking by the second MG 30 is performed, and the battery 70 is charged with the electric power that is generated by the second MG 30. Accordingly, the battery electric power Pb is a negative (−) value and drops (absolute value increases) as the vehicle speed increases.

In the example that is illustrated in FIG. 4, the sum of the battery electric power Pb and the predicted value α of the cranking power generation electric power exceeds the threshold Pwin (that is, Pb+α<Pwin) at time t1 when the vehicle speed reaches the upper limit vehicle speed Vmax. Accordingly, the ECU 200 promptly performs the cranking on the engine 10 at the time t1 and starts the engine 10. As a result, the electric power that is input into the battery 70 exceeding the battery-acceptable electric power Win can be suppressed even if the cranking power generation electric power is generated during the cranking.

Figure 5:
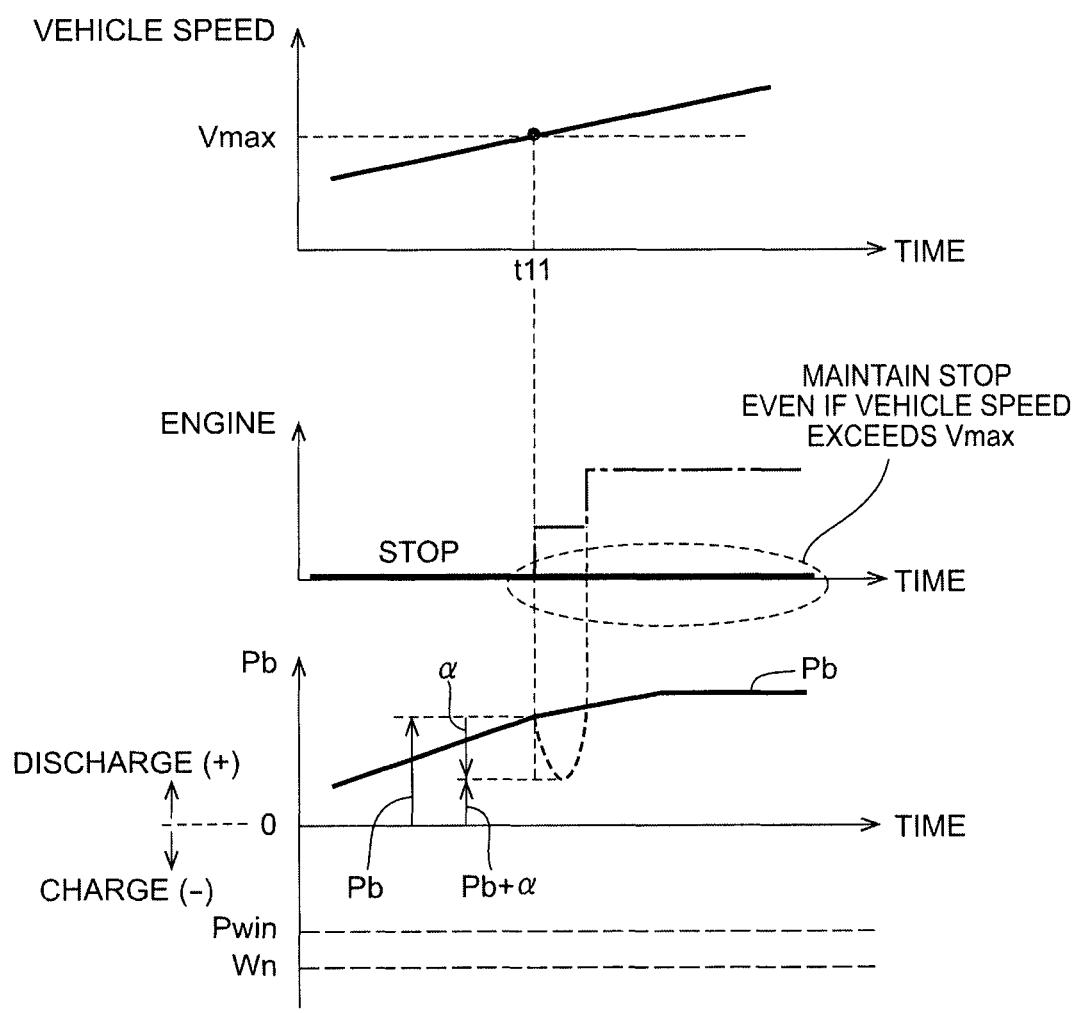
FIG. 5 is a diagram illustrating state changes of the engine and the battery electric power (second embodiment).

FIG. 5 is a diagram illustrating state changes of the engine 10 and the battery electric power Pb in a case where the vehicle speed increases in an accelerator ON (accelerator opening>0) state during the motor traveling.

In a situation in which the motor traveling is performed in the accelerator ON state, the traveling uses the power of the second MG 30, and thus the electric power is output from the battery 70 to the second MG 30. Accordingly, the battery electric power Pb is a positive (+) value and increases (absolute value increases) as the vehicle speed increases.

In the example that is illustrated in FIG. 5, the vehicle speed reaches the upper limit vehicle speed Vmax at time t11 but the sum of the battery electric power Pb and the predicted value α of the cranking power generation electric power does not exceed the threshold Pwin (that is, Pb+α>PWin) since the battery 70 is in discharging. In other words, the cranking power generation electric power is consumed by the second MG 30 or the other electric equipment at a discharge destination (for example, auxiliary machine such as the air-conditioning device) even if the cranking is performed, and thus it is predicted that the electric power exceeding the battery-acceptable electric power Win is not input into the battery 70.

In a case where the sum of the battery electric power Pb and the predicted value α of the cranking power generation electric power does not exceed the threshold Pwin (that is, in a case where it is predicted that the electric power input into the battery 70 during the cranking does not exceed the threshold Pwin), the ECU 200 according to this embodiment maintains a state which the engine 10 is stopped even after the time t11 when the vehicle speed reaches the upper limit vehicle speed Vmax. In this manner, unnecessary starting of the engine 10 during the motor traveling can be suppressed.

As described above, the ECU 200 according to this embodiment determines whether or not to start the engine 10 during the motor traveling based on a comparison between the sum of the battery electric power Pb and the predicted value α of the cranking power generation electric power and the threshold Pwin corresponding to the battery-acceptable electric power Win. In other words, the ECU 200 determines whether or not to start the engine 10 during the motor traveling based on not only the predicted value α of the cranking power generation electric power and the battery-acceptable electric power Win but also the battery electric power Pb. Accordingly, unnecessary starting of the engine during the motor traveling can be suppressed.

It should be noted that the embodiment disclosed herein is a non-limiting example in every aspect. The scope of the invention is clarified not by the above description but by the claims, and the invention is intended to include every modification having the same meaning and scope as the claims.

The invention claimed is:

1. A vehicle comprising:
an engine;
a motor connected to a drive wheel, the vehicle being to travel by using power from at least one of the motor and the engine;
a rotary electric machine connected to the engine and the motor via a planetary gear device, the rotary electric machine configured to rotate in a direction opposite to a rotation direction of the motor during a motor traveling mode of operation, the motor traveling mode being one in which the vehicle is allowed to travel on the power of the motor while the engine is stopped;
a battery configured to exchange electric power with a plurality of electric equipment including the motor and the rotary electric machine; and
an ECU configured to
control the rotary electric machine to generate electric power when the engine is started during the motor traveling mode and provide a cranking torque to the engine, the electric power generated by the rotary electric machine increasing as a vehicle speed increases, and
determine whether or not to start the engine based on a comparison between a sum of electric power and a value corresponding to electric power acceptable by the battery, wherein the sum of electric power is a sum of first electric power actually input into and output from the battery during the motor traveling mode and second electric power predicted to be generated by the rotary electric machine while the cranking torque is provided to the engine.

2. The vehicle according to claim 1, wherein the ECU is configured to start the engine by providing the cranking torque to the engine when the sum of the electric power exceeds the value corresponding to the electric power acceptable by the battery.

3. The vehicle according to claim 1, wherein the ECU is configured to maintain a state in which the engine is stopped, when the vehicle speed exceeds an upper limit vehicle speed for the motor traveling mode and the sum of the electric power does not exceed the value corresponding to the electric power acceptable by the battery, the upper limit vehicle speed is set according to the electric power acceptable by the battery.

4. The vehicle according to claim 1, wherein
the planetary gear device includes a sun gear connected to the rotary electric machine, a ring gear connected to the motor, a pinion gear engaged with the sun gear and the ring gear, and a carrier supporting the pinion gear to be rotatable and connected to the engine, and
the ECU configured to set the electric power predicted to be generated by the rotary electric machine while the cranking torque is provided to the engine to a larger value as the vehicle speed increases.

* * * * *